United States Patent [19]

Cheng et al.

[11] Patent Number: 4,833,604

[45] Date of Patent: May 23, 1989

[54] METHOD FOR THE RELOCATION OF LINKED CONTROL BLOCKS

[75] Inventors: Josephine M. Cheng; Nicholas V. Nomm, both of San Jose; Jay A. Yothers, Gilroy, all of Calif.

[73] Assignee: International Business Machines Corporation, Armonk, N.Y.

[21] Appl. No.: 818,432

[22] Filed: Jan. 13, 1986

[51] Int. Cl.[4] ............................................. G06F 15/16
[52] U.S. Cl. .................................... 364/200; 364/300
[58] Field of Search ................ 364/200 MS File, 300, 364/900 MS File

[56] References Cited

U.S. PATENT DOCUMENTS

| 4,084,224 | 4/1978 | Appell et al. | 364/200 |
| 4,126,894 | 11/1978 | Cronshaw et al. | 364/200 |
| 4,231,088 | 10/1980 | Hammer et al. | 364/200 |
| 4,330,822 | 5/1982 | Dodson | 364/200 |

Primary Examiner—Thomas M. Heckler
Assistant Examiner—Jonathan C. Fairbanks
Attorney, Agent, or Firm—R. Bruce Brodie; Henry E. Otto, Jr.

[57] ABSTRACT

A two-pass method for relocating a set of linked control blocks stored away on a persistent medium after a first pass and then rewritten into internal memory of a computing facility during second and subsequent passes each time an application to which the control blocks are bound is executed. The first pass involves path following and coloring pointers affected by the relocation, mapping discontiguously located blocks into a linear address space, changing affected control blocks to location offsets, and writing out the linked control blocks to DASD store. Upon the second pass, virtual addresses are substituted for the offsets upon rewriting of the control blocks to internal memory.

6 Claims, 4 Drawing Sheets

FIELDS 1-10 CONTAIN ADDRESSES A-I

LINKED CONTROL BLOCKS IN DISCONTIGUOUS INTERNAL MEMORY LOCATIONS

FIELDS 1-10 CONTAIN ADDRESSES A-I

LINKED CONTROL BLOCKS IN DISCONTIGUOUS INTERNAL MEMORY LOCATIONS

FIELDS 1-10 NOW CONTAIN OFFSETS TO A-I WITHIN
THE CONTIGUOUS BLOCKS
RELOCATION DIRECTORY CONTAINS LOCATIONS OF FIELDS
1-10 IN THE COMPRESSED BLOCK

COMPRESSED & CONTIGUOUS CONTROL BLOCKS
IN LINEAR SPACE

HOW IS RELOCATION DONE ?
  BY "A STRUCTURE FOR RELOCATION OF STRUCTURES"

STRUCTURE FOR RELOCATION OF STRUCTURE "A"

DESCRIPTION OF STRUCTURE "A" HEADER

> TYPE OF BLOCK
> # OF POINTERS IN "A"'s HEADER
> # OF POINTERS IN EACH ENTRY
> WHERE TO FIND THE ACTUAL NUMBER
>   OF ENTRIES
> LENGTH OF HEADER
> LENGTH OF EACH ENTRY

DESCRIPTION OF EACH POINTER IN "A"

> WHERE TO FIND EACH POINTER
> TYPE OF OBJECT POINTED TO
> WHERE TO FIND THE DESCRIPTOR FOR
>   THAT TYPE OF BLOCK

•
•
•

•
•
•

STRUCTURE FOR RELOCATION OF STRUCTURE "N"

FIG. 4

METHOD FOR THE RELOCATION OF LINKED CONTROL BLOCKS

TECHNICAL FIELD

This invention relates to the relocation of executable control structures, and more particularly, to the relocation of a set of linked control blocks in a computing facility where the control blocks must be stored away on a persistent medium and then rewritten into the internal memory portion of the computing facility each time an application to which the control blocks are bound is to be executed.

BACKGROUND

It is broadly old to dynamically relocate code at runtime given that the code to be executed is larger than the available internal memory of a computing facility. Segmentation, overlays, and libraries are among the mechanisms which permit nonresident code to be called in from external memory, such as DASD, only as needed. However, the binding of the code to internal memory addresses must still be imposed on all of such referenced segmentations, overlays, and library elements.

Peterson and Silberschatz, "Operating System Concepts", Addison-Wesley Publishing Co., copyright 1983, pp. 137-139, describe one method of dynamically managing code relocation in which internal memory address binding of the code is delayed until execution (runtime). The code is mapped in Peterson's scheme into a linear address space formed by a base plus an offset to that base. In this regard, the base is supplied by a dedicated register, while the offset is supplied extrinsically.

Another method of dynamically managing code relocation in which address binding is delayed until runtime is set out in Drogichen, U.S. Pat. No. 4,138,738, "Self-contained Relocatable Memory Subsystem", issued Feb. 6, 1979. Drogichen teaches that ROM-stored code/data sequences may be relocated in CPU internal store if additional stored bits appending each code/data word are used to designate a set of external registers. The contents of these designated registers are operands in the computation of an effective internal memory address for the counterpart code/data word being moved.

In the field of data base management systems, C. J. Date, "A Guide to DB2", Addison-Wesley Publishing Co., copyright 1984, discloses the compile and runtime involvements of the elements of a relational system for accessing information. The information typically is located on a staged storage system and is obtained by way of a computing facility. The data is organized by the computing facility under any one of the popular storage and accessing methods such as IMS, VSAM, or ISAM. Relational accessing is executable in either an interactive or deferred execution mode. As Date points out, relational accessing has provided a popular and flexible manner by which subsets of data are obtained by imposing relations through a query. The advantage of relational accessing is that a near-infinite number of relations can be imposed upon data without the necessity of storing concordances representing those relations.

When a data base system is operated in an interactive mode, an access statement is processed by the data base manager interpretively by way of tables. Since the tables per se are not stored on a persistent medium, such as DASD, they must be formed each time and made resident in main memory for the duration of the interactive processing. There is no perceived need for relocation. In contrast, deferred accessing involves relational statements which are embedded in an application. The application itself may be executable at multiple disparate times. For this reason, optimized compiled machine-executable code is a necessary condition for such processing. When the application is being compiled, the control blocks, such as skeleton cursor tables, constituting each relational access are formed and associated with or "bound" to the application. These skeleton control blocks are then stored on a persistent medium, such as DASD. At execution or "runtime", the control blocks must then be relocated from DASD to main memory in a form ready for utilization.

A relational system includes more than merely a compiler and link loader. It is, according to Date, formed from a precompiler, a binder, a runtime supervisor, and a stored data manager. The precompiler collects relational accessing statements from application programs and forms data base request modules. The accessing statements in the original program are replaced by host language calls to the runtime supervisor. The binder is the active component responsive to each of the request modules for producing optimized machine-executable code implementing the relational accessing statements. This code is generated in the form of control blocks which may be considered as a specialized form of a linked list.

THE INVENTION

It is an object of this invention to devise a method for the relocation of linked control blocks into the internal memory portion of a computing facility each time an application to which the control blocks are bound is to be executed.

This object is satisfied by a two-pass method. During a first pass, preferably at bind time, the method path follows through the set of discontiguous linked control blocks identifying the relative order of the blocks forming each path, maps the path-followed set into a linear address space, and converts any links affected by the mapping into corresponding location offsets in the linear address space. The mapped linked control blocks, including the converted links in their linear-mapped order, are then stored onto a persistent medium. During second and subsequent passes, the method involves rewriting the set of linked control blocks from the persistent medium to the internal memory. It includes substituting virtual addresses for location offsets in the affected links.

During the first pass, the mapping step includes forming a directory for each address space of control blocks. The directory is a list of offsets to pointers which require relocation. Further, the directories are collectively appended to the linear-mapped order of link-listed control blocks. Significantly, within the mapping step, the offsets within the directory maintain and preserve the path-following order upon rewriting of the stored linked lists from the persistent medium to the internal memory during second and subsequent passes.

BRIEF DESCRIPTION OF THE DRAWING

FIG. 4 depicts some of the information elements contained in each control block.

DESCRIPTION OF THE PREFERRED EMBODIMENT AND INDUSTRIAL APPLICABILITY

Figure 1:
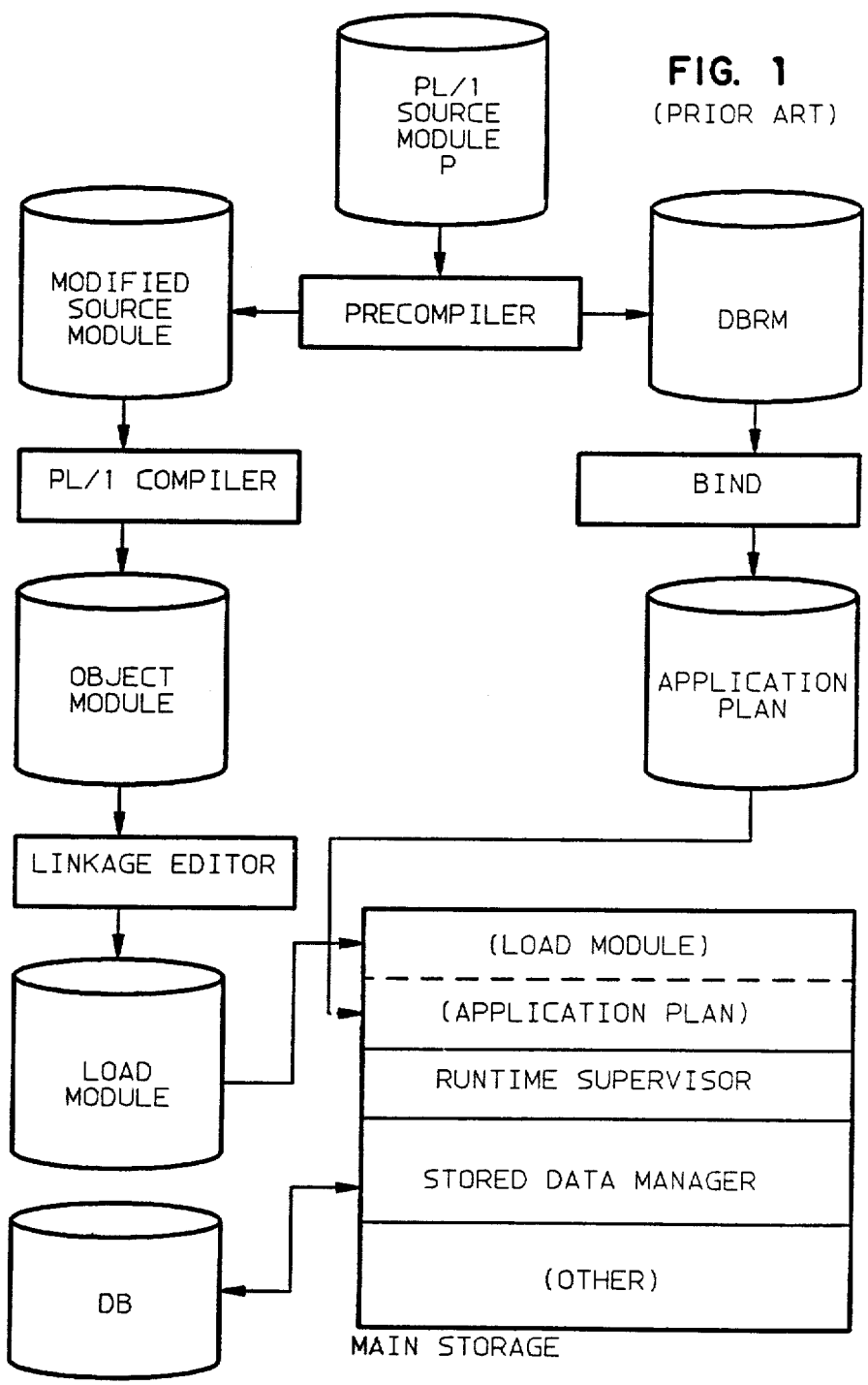
FIG. 1 shows the control flow for processing applications with embedded relational accessing statements according to the prior art.

Referring now to FIG. 1, there is shown a flow of control for the processing of applications software, including embedded relational accessing statements. Each source module of application software is parsed by the precompiler. Tokens or high-level language calls replace each relational accessing statement so as to modify the source module. The modified source modules are compiled into object modules and processed in a conventional manner. The relational accessing statements are also formed into "modules" and compiled by way of the binder so as to form a set of such modules. Both the control blocks forming the application software and the relational accessing statements are incorporated as sets of link-listed control blocks and are stored outboard on a staged storage system attaching a computing facility.

Figure 2:
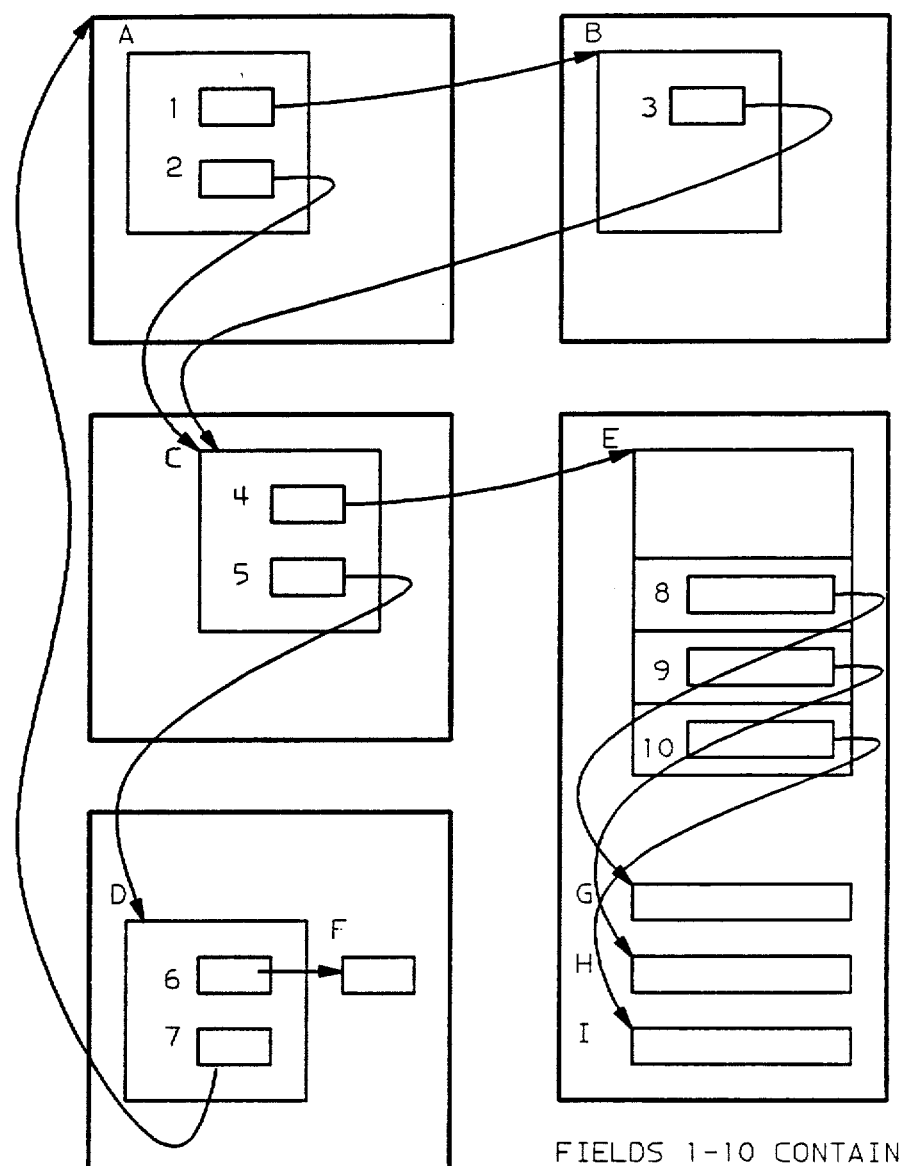
FIG. 2 shows a sample of linked control blocks in discontiguous locations within internal memory, including pointers defining various in and out degree graph relations and paths or loops.

Referring now to FIG. 2, there is shown a linked list of control blocks (CBs) A-E residing in discontiguous locations within the internal memory portion of the computer facility. The invention provides for the relocation of these blocks. The most commonly occurring pointer relations are illustrated. Control block A, fields 1 and 2, respectively point to control blocks B and C, while control block B contains only a single field, field 3. Field 3 is directed to control block C. In turn, control block C has fields 4 and 5 pointing to two other control blocks, namely D and E. Control block C in the graph theoretic sense is in-degree two since it is pointed to by two or more control blocks. There also exists a loop relation among control blocks. This loop is formed by blocks A, B, C, D, and E. Both the varying in and out degrees of each node and loop complicate any path following. The relocation of such linked control blocks has therefore a high expectation of involving an error condition arising from an attempt to relocate the same block more than once, resulting in an ABEND.

It should be recognized that there are several types of control blocks. A first type exhibits a fixed length. Any pointer fields in each type are always located in a predetermined position. On the other hand, a variable length block, such as control block E, consists of a header portion, several pointer entries, and counterpart control blocks embedded therein.

At compile time, it is necessary to trace the paths of any set of linked control blocks. This path or trace provides a relative ordering among the blocks which must be preserved invariant upon relocation. Having the path-following information in tabular form, it is then possible to focus on the next step in the relocation method. The next step concerns the conversion of blocks discontiguously located in internal memory into a format for recording on DASD and later to be read back into internal storage. Restated, it is desired to map the block relative starting addresses into counterpart virtual base plus displacement addresses. This means that the pointer fields in a control block must be converted into offsets upon moving the control blocks to DASD. It should be again emphasized that when rewriting from external to internal memory, the original absolute addresses are no longer applicable.

Figure 3:
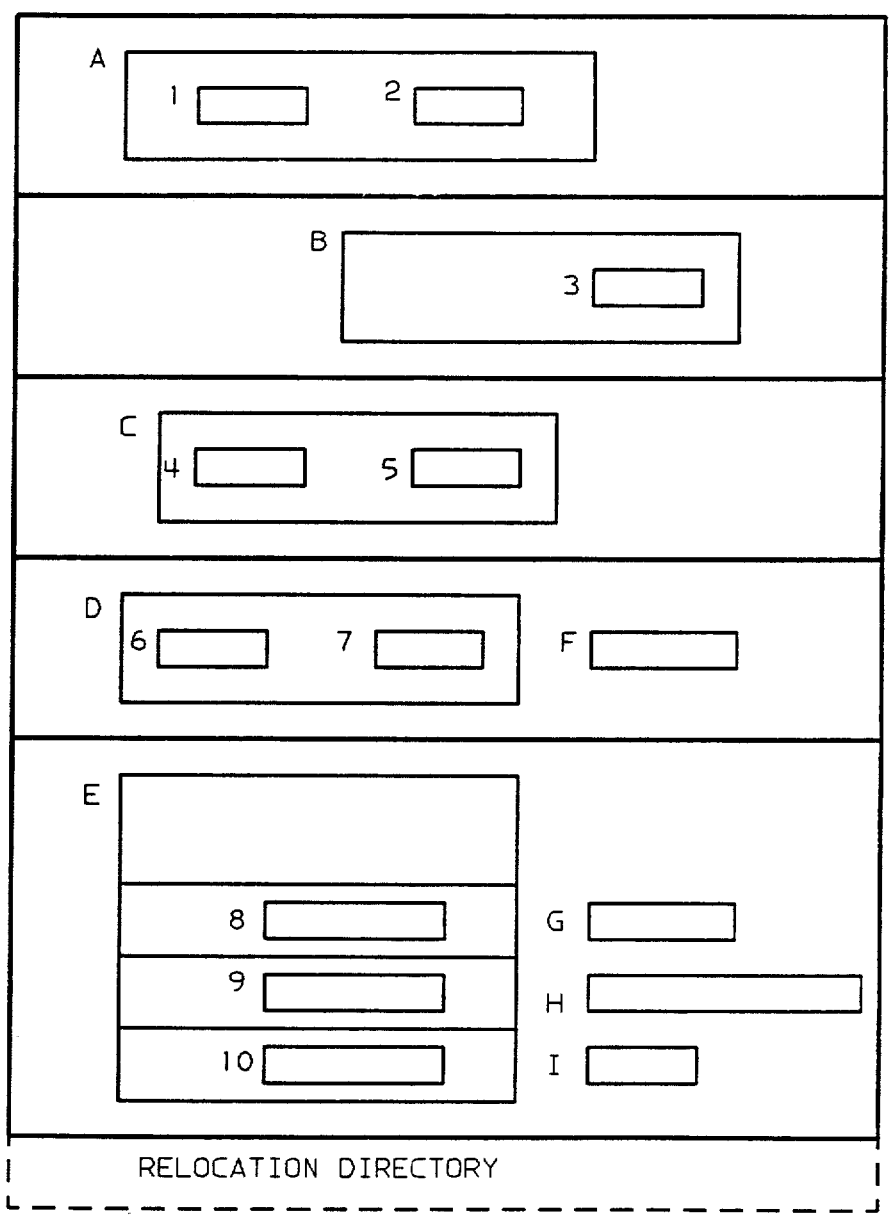
FIG. 3 sets forth a compressed and contiguous form of said linked control blocks in a linear space.

Referring now to FIG. 3, there is shown a compressed and contiguous form of the linked control blocks, including a relocation directory appended thereto. The directory simplifies the reconversion of offsets into addresses upon relocation back from DASD into internal memory. The relocation directory is a list of fields requiring relocation. This avoids a path-following (tree-walking) algorithm when offsets are converted to addresses. Path following requires a more complex behavior than merely reading a list. Furthermore, a directory is a data object generated as a consequence of path following.

It should be appreciated that with a directory, the restoration of offsets to addresses merely requires adding the field contents to a common starting address and rewriting the result into the field. Locating the next field to relocate only requires indexing to the next element in the directory, instead of path following to find the next pointer field to relocate. Another possible algorithm to relocate from a pointer stack into addresses would be to use the path-following algorithm again.

As previously mentioned, the first pass in the invention occurs during the bind (compile equivalent) process. The reconversion from DASD to internal memory relocation occurs at runtime.

Referring now to FIG. 4, there is illustrated a control block description including such attributes as name, length, number of pointers, and pointer attributes. This data object description facilitates relocation and it is used in the following manner:

At the first pass (at bind time), it is necessary to calculate the total length of discontiguous blocks and then copy discontiguous blocks into contiguous space. Next, it is required to build relocation directories for all pointers. This means that in each control block, if it has already been relocated, consider it to be "colored" in the classical "greedy algorithmic sense". Note that network path following to ascertain or alter properties of nodes or links is described in Aho et al, "Data Structures and Algorithms", Addison-Wesley Publishing Co., copyright 1983, pp. 7-9, 321-324. In this reference, Aho describes the "Greedy Algorithm" for coloring nodes and/or links while traversing a graph of nodes and links. To continue, if the control block has not been marked as relocated, then relocate pointers in each header, in each entry, and in each nonstandard repeating block. The term "relocate" is taken to mean converting an old address into an offset in a contiguous copy of blocks, and adding the relative location of the pointer to one of three lists of pointers requiring relocation. These lists are:

1. pointers pointing to locations in the same address space,
2. pointers pointing to locations in another address space, and
3. pointers not pointing, but instead containing offsets in still another address space.

Note the path following is directed by a structure for the relocation of structures as shown in FIG. 4.

TABLE

```
/* DSNXESX2                                                                                         */
/* RELOCATE POINTERS WITHIN THE PASSED BLOCK BY STORING THE OFFSET FROM THE FIELD                    */
/* TO THE START OF THE RELOCATED SPACEBLOCK IN EACH RELOCATABLE FIELD.                               */
/* Also make an entry into either the CUB, DVS, or Static Block Relocation Directory for             */
/* each Relocatable Field. The value entered is the BYTE offset of the Relocatable                   */
/* item from the start of the Relocated Spaceblk.                                                    */
/* ASSUMPTIONS:                                                                                      */
/* 1.  THE PASSED BLOCK ADDRESS IN IN THE NEW, CONTIGUOUS SPA.                                       */
/* 2.  ALL RELOCATABLE FIELDS IN THE PASSED BLOCK HAVE THE OLD DISCONTIGUOUS                         */
/*     SPACEBLOCK ADDRESSED IN THEM. THESE MUST BE CONVERTED INTO OFFSETS                            */
/*     RELATIVE TO THE NEW CONTIGUOUS SPACEBLOCK.                                                    */
/* 3.  THE PASSED SPACEBLOCK ADDRESS IS THE NEW, CONTIGUOUS SPA                                      */

DSNXESX2: ENTRY(TDAD,TAD,SPAADR,BLKADD);
    DCL TDAD        PTR(31);              /* LOCAL COPY OF PASSED POINTER              */
    DCL TAD         PTR(31);              /* LOCAL COPY OF PASSED POINTER              */
    DCL SPAADR      PTR(31);              /* LOCAL COPY OF PASSED POINTER              */
    DCL BLKADD      PTR(31);              /* LOCAL COPY OF PASSED POINTER              */
    DCL RLDVALUE    FIXED(31);            /* Byte offset of Relocatable item
                                              from start of SPACEBLK. Value
                                              to be placed in a RLD.                   */
    RFY RLDTBL BASED(SPARLDT);            /* Permit addressability to RLDTBL            */
    DSCPTR  =TDAD;                        /* LOCAL COPY OF PASSED POINTER              */
    BPTR    =TAD;                         /* LOCAL COPY OF PASSED POINTER              */
    SPACEPTR=SPAADR;                      /* LOCAL COPY OF PASSED POINTER              */
    BLKDPTR =BLKADD;                      /* LOCAL COPY OF PASSED POINTER              */
    IF EDSID =TRT THEN                    /* CHECK TABLE YPE RT                        */
      DO;                                 /* GET RT DESCRIPTOR                         */
        RFY RTENTRY BASED(BPTR);
        IF RTOPCOD < ZERO                 /* TEST FOR NEGATIVE             KED0382*/
           THEN RETURN;                   /* MEANS ALREADY RELOCATED       KED0382*/
        DO I = 1 TO NUMCODES;             /* LOOK FOR RTCODE                           */
          IF RTOPCOD = DSCRTC(I)
             THEN GO TO FNDRTC;           /* FOUND RTCODE                              */
        END;                              /* LOOK FOR RTCODE                           */
        XEERMSGT='MISSING RTOPCOD VALUE IN RTCODES';
        XEERMSGL=33;
        CALL DSNXEER(PNAME,500,SRCPOOO,XEERMSG);
        SQLERRD4 = RTOPCOD;               /* SAVE FOR DEBUGGING EASE                   */
        ?DSNVABND REASON(ARCINTER);
FNDRTC:
        DSCPTR = DSCRTD(I);
        RTOPCOD = -RTOPCOD;               /* INDICATE RT IS RELOCATED      KED0382*/
        RLDVALUE = ADDR(RTOPCOD) - SPACEPTR;  /* Determine RTOPCOD loc.                */
        CALL MAKENTRY(RLDTPOPC,RLDVALUE,SPASTGCH); /* Put in */
        Opcode RLD
      END;                                /* END GET RT DESCRIPTOR                     */
    IF (EDSHPN>ZERO) &                    /* ARE THERE POINTERS IN B: HDR              */
       (EDSID < TNTRY) THEN
      DO I=1 TO EDSHPN;                   /* RELOCATE POINTERS IN HEADER               */
        OBPTR=BPTR+EDSFDO(I);             /* GET ADDR OF RELOCATABLE FIELD             */
        IF EDSFDD(I)                      ZERO THEN DYNMIND = ZERO;
        ELSE                              /* FIELD COULD BE DYNAMIC                    */
          DO;
            DYNMPTR=BPTR+EDSFDD(I);       /* GET ADDR OF IT'S DYNAMIC IND              */
            DYNMIND=DYNINCC & EDSFDB(1);  /* GET DYNAMIC IDICATOR                      */
          END;
```

```
/*              If CUB ptr is nonzero then enter it into the                                         */
/*              CUB RLD. This places a dependency on Data              KE$0030                       */
/*              Manager that a CUB can never have a zero offset.                                     */
IF (EDSFDT(I) = TCUB) THEN                /* Make an entry into CUB RLD only           */
IF OBPTR->RELOFW  = ZERO THEN             /* if CUB ptr nonzero KE$0030                */
    DO;
        RLDVALUE = (OBPTR - SPACEPTR);    /* Calc byte offset of                       */
        CALL MAKENTRY(RLDTPCUB,RLDVALUE,SPASTGCH);  /* Reloc item */
    END;                                  /* & put in CUB RLD                          */
ELSE;                                     /* CUB ptr is zero,no entry KE$0030          */
ELSE IF (DYNMIND = ZERO) THEN             /* IF STATIC THEN                            */
    IF OBPTR->RELOWORD > 0 THEN           /* Field is nonzero                          */
        DO;
            IF EDSFDT(I)<=RELOC THEN      /* IF FIELD->RELOCATABLE OBJECT              */
                DO;                       /* DETERMINE WHETHER OBJECT IS TO
                                             BE CONVERTED TO AN OFFSET                 */
                    OFST=EDSDP(I);        /* GET POINTED-TO-OBJECT DESCRIPTR           */
                    CALL GETADDR(OBPTR->RELOWORD);  /* GET NEW SPA ADDR                */
                    CALL DSNXESX2(OFST,BADDR,SPACEPTR,BLKADD);
                END;                      /* Object is relocatable                     */
/*                                                                                                  */
/*                       Relocate to object itself                                                   */
/*                                                                                                  */
                    CALL GETADDR(OBPTR->RELOWORD);  /* GET NEW SPA ADDR OF
```

TABLE-continued

```
            OBPTR->RELOWORD = BADDR-SPACEPTR;           /* THE OBJECT                                    */
            RLDVALUE = (OBPTR - SPACEPTR);              /* Reloc item. Get byte                          */
            CALL MAKENTRY(RLDTPBLK,RLDVALUE,SPASTGH);   /* offset & place in                             */
                END;                                    /* Static RLD                                    */
                ELSE;                                   /* Field points to an object                     */
        ELSE                                            /* Field is zero                                 */
        DO;                                             /* FIELD PTS TO A DYNAMIC VAR BUFF               */
            IF (OBPTR->RELOFW)< ZERO THEN               /* FIELD PTS TO A DVS BUFF         TU13BE*/
                DO;                                     /* CHECK FOR ...                   TU13BE*/
                NUMEN = OBPTR->RELOWORD;                /* INVALID DVS OFFSET ...          TU13BE*/
                XEERMSGT='DVS OFFSET OUT OF RANGE.';    /* FOR DEBUGGING EASE              TU13BE*/
                XEERMSGL=24;
                CALL DSNXEER(PNAME,600,SRCP000,XEERMSG);
                SQLERRD4 = NUMEN;                       /* SAVE FOR DEBUGGING ...          TU13BE*/
                SQLERRD5 = OBPTR;                       /* SAVE FOR DEBUGGING ...          TU13BE*/
                SQLERRD6 = BPTR;                        /* SAVE FOR DEBUGGING ...          TU13BE*/
                ?DSNVABND REASON(ARCINTER);
                END;                                    /* INVALID DVS OFFSET ...          TU13BE*/
            RLDVALUE = (OBPTR - SPACEPTR);              /* Calc Offset & Place in                        */
            CALL MAKENTRY(RLDTPDVS,RLDVALUE,SPASTGCH);  /* DVS RLD.                                      */
            END;                                        /* FIELD PTS TO A DVS BUFF         TU13BE*/
        END;                                            /* END RELOCATE POINTERS IN HEADER               */
    IF (EDSIDSIMPL) &
        (EDSIDTNTRY) THEN
        DO;                                             /* ENTRY TYPE OF BLOCK                           */
        NUMEN=(BPTR+EDSONE)->HW;                        /* GET NUMBER OF ENTRIES                         */
        ENTOFF = ZERO;                                  /* INITIALIZE OFFSET TO ENTRY                    */
        IF NUMEN > ZERO THEN                            /* IF THERE ARE ENTRIES                          */
            DO J = 1 TO NUMEN;                          /* DO EACH ENTRY IN THE TABLE                    */
            L = EDSHPN;                                 /* INDEX PAST HEADER ENTRIES                     */
            NUMPT = EDSEPN;                             /* SET NUMBER OF PTRS IN EACH ENT                */
            IF EDSID=TBTBL THEN
                DO;                                     /* SPECIAL CODE FOR BTBL                         */
                RFY RTENTRY BASED(BPTR);
                IF (BTBLODT(J) & 'FC'X) = BDTVCH
                    THEN NUMPT=3;                       /* HANDLE VARCHAR DATA TYPE                      */
                END;                                    /* SPECIAL CODE FOR BTBL                         */
            DO K = 1 TO NUMPT;                          /* DO EACH PTR IN EACH ENTRY                     */
                L = L + 1;                              /* INDEX TO NEXT DESCR ENTR                      */
                OBPTR =   BPTR +                        /* OBJECT TABLE ADDRESS                          */
                          EDSLH +                       /* LENGTH OBJECT TABLE HEADER                    */
                          ENTOFF +                      /* OFFSET TO CURRENT ENTRY                       */
                          EDSFDO(L);                    /* OFFSET TO FIELD IN ENTRY                      */
                IF EDSFDD(L) < ZERO THEN DYNMIND = ZERO;
                ELSE                                    /* FIELD COULD BE DYNAMIC                        */
                DO;
                    DYNMPTR =    BPTR +                 /* OBJECT TABLE ADDRESS                          */
                                 EDSLH +                /* LENGTH OBJECT TABLE HEADER                    */
                                 ENTOFF +               /* OFFSET TO CURRENT ENTRY                       */
                                 EDSFDD(L);             /* OFFSET TO FIELD'S STAT/DYN BIT*/
                    DYNMIND=DYNINDC & EDSFDB(L);        /* GET DYNAMIC INDICATOR                         */
                END;
                IF OBPTR->RELOWORD > 0 THEN             /* NONZERO POINTER                               */
                DO;
                    IF (DYNMIND = ZERO) THEN            /* IF STATIC                                     */
                    DO;
                        IF EDSFDT(L)<=RELOC THEN
                        DO;                             /* POINTED-TO-OBJECT IS RELOCATABL               */
                            OFST=EDSDP(L);              /* GET POINTED-TO-OBJECT DESCR                   */
                            CALL GETADDR(OBPTR->RELOWRD); /* GET NEW SPA                                 */
                            CALL DSNXESX2(OFST,BADDR,SPACEPTR,
                                BLKADD);                /* RELOCATE POINTED-TO OBJECT                    */
                            END;                        /* POINTED-TO-OBJECT IS RELOCATABL               */
                        ELSE;                           /* FIELD IS NOT RELOCATABLE                      */
                        CALL GETADDR(OBPTR->RELOWORD);  /* GET NEW SPA                                   */
                        OBPTR->RELOWORD =               /* RELOCATE THIS FIELD                           */
                            BADDR-SPACEPTR;             /* RELOCATE THIS FIELD                           */
                        RLDVALUE = (OBPTR-SPACEPTR);    /* Get offset & put in                           */
                        CALL MAKENTRY(RLDTPBLK,RLDVALUE,SPASTGCH);
                        END;                            /* Static Blk RLD                                */
                    ELSE                                /* FIELD PTS TO A DYNAMIC VAR BUFF               */
                    DO;                                 /* Get offset & place value in                   */
                        RLDVALUE = (OBPTR-SPACEPTR);    /* DVS RLD                                       */
                        CALL MAKENTRY(RLDTPDVS,RLDVALUE,SPASTGCH);
                        END;
                    END;                                /* Field is nonzero                              */
                END;                                    /* END DO EACH PTR IN EACH ENTRY                 */
                ENTOFF=ENTOFF+EDSLE;                    /* POINT OFFSET TO NEXT ENTRY                    */
            END;                                        /* END DO EACH ENTRY IN THE TABLE                */
        END;                                            /* END ENTRY TYPE OF BLOCK                       */
    IF EDSID = TSELL THEN                               /* SPECIAL CODE FOR MSISELL                      */
```

TABLE-continued

```
DO;                                                       /* RELOCATE POINTERS IN MSISELL          */
   SELP = BPTR;                                           /* SAVE MSISELL(*) BASE                  */
   RFY MSISELL BASED(SELP)
   DO I=1 BY 1 UNTIL MSICOAOR(I)='00'B;                   /* DO UNTIL LAST MSISELL                 */
                                                          /* Note: MSISELL fields are always       */
                                                          /* static                                */
      IF MSISLREL(I) = YES                                /* IF THE MSISELL ETRY IN        KED0387*/
      THEN;                                               /* OFFSET FORM ALREADY,SKIP      KED0387*/
      ELSE                                                /* Otherwise process the MSISELL         */
      DO;
         MSISLREL(I) = YES;                               /* MSISELL NOW HAS OFFSET        KED0387*/
         OBPTR=BPTR+EDSFDO(1);                            /* GET ADDR OF RELOCATABLE FIELD         */
         IF OBPTR->RELOWORD > 0 THEN                      /* CONVERT TO AN OFFSET                  */
         DO;
            CALL GETADDR(OBPTR->RELOWORD);                /* GET NEW SPA ADDR                      */
            OBPTR->RELOWORD = BADDR-SPACEPTR;
            RLDVALUE = (OBPTR-SPACEPTR);                  /* Calc offset & put                     */
            CALL MAKENTRY(RLDTPBLK,RLDVALUE,SPASTGCH);    /* in STatic Blk RLD                     */
         END;                                             /* RELOCATE FIELD                        */
      END;                                                /* MSISELL should be processed           */
      BPTR = BPTR+LENGTH(MSISELL);
   END;                                                   /* DO UNTIL LAST MSISELL                 */
END;                                                      /* END RELOCATE POINTERS IN MSISELL*/
IF EDSID = TFLD THEN                                      /* FOR MSIFLED BUFFERS                   */
DO;                                                       /* RELOCATE POINTERS IN MSISELL          */
   SELP = BPTR;                                           /* SAVE MSIFLD (*) BASE                  */
   RFY MSIFLD
   BASED(SELP);
   DO I=1 BY 1 UNTIL MSIFNLST(I)=NO;                      /* DO UNTIL LAST MSIFLD                  */
      OBPTR=BPTR+EDSFDO(1);                               /* GET ADDR OF RELOCATABLE FIELD         */
      DYNMPTR=BPTR+EDSFDD(1);                             /* GET ADDR OF ITS STAT/DYN BIT          */
      DYNMIND=DYNINDC & EDSFDB(1);/* GET DYNAMIC          */
      INDICATOR
      IF (DYNMIND = ZERO) &                               /* IF STATIC AND NONZERO THEN            */
         OBPTR->RELOWORD > 0 THEN                         /* CONVERT TO AN OFFSET                  */
      DO;
         CALL GETADDR(OBPTR->RELOWORD);                   /* GET NEW SPA ADDR OF OBJT              */
         OBPTR->RELOWORD = BADDR-SPACEPTR;
         RLDVALUE = (OBPTR-SPACEPTR);                     /* Calc offset & put                     */
         CALL MAKENTRY(RLDTPBLK,RLDVALUE,SPASTGCH);       /* in Static Blk RLD                     */
      END;                                                /* FIELD PTS TO A STATIC VAR BUFF        */
      ELSE IF OBPTR->RELOWORD > 0 THEN                    /* FIELD PTS TO A DYNAMIC                */
      DO;                                                 /* Variable Buffer.                      */
         RLDVALUE = (OBPTR-SPACEPTR);                     /* Calc offset & put                     */
         CALL MAKENTRY(RLDTPDVS,RLDVALUE,SPASTGCH);       /* in DVS RLD                            */
      END;
      ELSE;                                               /* Else MSIFLPTR value is zero, do
                                                             NOT place in a RLD.                   */
      BPTR = BPTR+LENGTH(MSIFLD );
   END;                                                   /* DO UNTIL LAST MSIFLD                  */
END;                                                      /* END RELOCATE POINTERS IN MSIFLD       */
RETURN;                                                   /* END OF DSNXESX2 PROCEDURE             */
```

Referring now to Table 1, there is shown a high-level PL/I-like software fragment for relocating pointers from a discontiguously located control block into a contiguous or linear address space. As pointed out in the comment section of the code, there are necessary assumptions which must exist in order for the code to be operable in the computing facility. As is typical in block-structured languages, it is preceded by a set of declarations and then a series of nested loops. The code fragment functionally in block-structured pseudocode operates as follows:

While there are still unprocessed control blocks in the linked list:

```
Begin;
   If this block is of a type permitting a loop then:
      If it is already relocated then skip
      further processing of this block.
      Else mark it as relocated, and find the descriptor
      for this particular control block type
      Relocate pointers in header portion of the block.
      Relocate pointers in each entry, if applicable.
      Relocate pointers in any nonstandard
      repeating block, if applicable.
```

-continued
```
End;
```

Having shown and described the preferred embodiment of the present invention, those skilled in the art will realize that various omissions, substitutions, and changes in forms and details may be made without departing from the spirit and scope thereof. It is the intention, therefore, to be limited only as indicated by the scope of the following claims.

What is claimed is:

1. A method for relocating a set of linked control blocks stored on a persistent medium after a first pass and then, during second and subsequent passes, rewritten into an internal memory of a computing facility each time an application to which the control blocks are bound is executed, comprising the steps of:
   (a) during the first pass,
      path following through the set of control blocks which may be of different size and format using a path-following algorithm that takes into account the contents of each block;

coloring pointers to retain a history of the first time each specific path is followed through specific linked control blocks of the set to preclude further relocation of the same ones of the control blocks in each such path;

mapping, into a linear address space, discontiguously located ones of said blocks by changing the colored pointers to location offsets;

compressing said linked control blocks contiguously into the linear address space; and writing the control blocks in compressed form to the persistent medium; and (b) during second and subsequent passes, rewriting the control blocks to the internal memory from the persistent medium and substituting virtual addresses for the location offsets.

2. A method according to claim 1, wherein during said first pass, the step of mapping includes forming a directory for the linear address space that contains the compressed control blocks, said directory listing pointers requiring relocation.

3. A method according to claim 2, wherein the step of mapping includes calculating the offsets within the directory in a manner which maintains and preserves the path-following order upon rewriting of the stored linked control blocks from the persistent medium to internal memory during the second and subsequent passes.

4. A method according to claim 2, wherein the directory is appended to the linear address space.

5. A method according to claim 1, wherein the control blocks may be of different types, each type having a positionally different pointer location, and further including, during the coloring step, identifying the type of control block pointed to.

6. A method according to claim 1, wherein the linked control blocks comprise a network of heterogeneously linked blocks.

* * * * *